United States Patent [19]
Schulz

[11] 3,845,397
[45] Oct. 29, 1974

[54] PULSE AMPLITUDE EVALUATION
[75] Inventor: Jurgen Schulz, Ulm, Donau, Germany
[73] Assignee: Licentia Patent-Verwaltungs-G.m.b.H., Frankfurt am Main, Germany
[22] Filed: Dec. 21, 1972
[21] Appl. No.: 317,249

[30] Foreign Application Priority Data
Dec. 22, 1971   Germany............................ 2163722
Nov. 30, 1972   Germany............................ 2258643

[52] U.S. Cl................... 328/117, 328/135, 328/151
[51] Int. Cl. ............................................. H03k 5/20
[58] Field of Search............ 328/110, 112, 114–117, 328/132, 135, 151

[56] References Cited
UNITED STATES PATENTS
2,996,624   8/1961   Mumma......................... 328/116 X
3,701,029   10/1972  Hogg.............................. 328/117 X
3,710,263   1/1973   Doty et al....................... 328/116 X
3,733,548   5/1973   Coulter et al.................. 328/117 X

*Primary Examiner*—John Zazworsky
*Attorney, Agent, or Firm*—Spencer & Kaye

[57]   ABSTRACT

For evaluating the amplitude of pulses having different amplitudes which exceed a given threshold value, an analog signal representing the maximum amplitude is stored in a pulse stretcher, the analog signal is converted into a digital signal by an analog/digital converter, the behavior of the pulse is observed for a period of time subsequent to the registration of a pulse maximum to determine if the pulse is increasing in amplitude, this indicating that the registered maximum was a result of noise signals, not useful pulses, and upon a determination that the pulse level is increasing during the relevant period of time, the digital signal produced as a result of noise is suppressed.

14 Claims, 10 Drawing Figures

PULSE AMPLITUDE EVALUATION

BACKGROUND OF THE INVENTION

This invention relates to a method of and circuits for evaluating the amplitudes of pulses having different amplitudes exceeding a given minimum amplitude. The method of the present invention relates, more particularly, to evaluating pulse amplitudes by intermediately storing the maximum amplitude of individual pulses and a subsequent analog/digital conversion, the intermediate storage being effected in a pulse stretcher.

One classic method presently used in the analog/digital conversion of pulse amplitudes is sometimes referred to as the zero crossover method and involves differentiating a pulse to obtain its first time derivative, which is zero at the instant the pulse is at its maximum, and storing the signal level then present for a sufficiently long period to enable the analog/digital conversion to be accomplished. In order to prevent undesirable noise from producing undesired trigger signals, only pulses which exceed a minimum threshold level are differentiated. Yet if the threshold level is set to a high value, low amplitude pulses are not differentiated. This disadvantage is particularly undesirable whenever pulses which have an initial gradual slope, such as those produced in particle detecting apparatuses, are to be evaluated.

A second classic method, which is often used in nuclear spectroscopy, involves setting a minimum threshold level, as in the first method. A trigger pulse for initiating the analog/digital conversion is derived after a fixed delay, from the first incidence of exceeding of the threshold. If the delay is unnecessarily long, a second, larger pulse may arrive during the period between the first pulse maximum and the beginning of the analog/digital conversion. In this case, the correct evaluation of the second pulse amplitude is effected, but not the evaluation of the first pulse amplitude. This drawback is particularly significant whenever pulses which have an initial gradual slope, such as those produced in particle detecting apparatuses, are to be evaluated.

SUMMARY OF THE INVENTION

It is an object of the present invention to provide a method of evaluating the pulse amplitudes of pulses which overcomes the above-mentioned drawbacks.

It is another object of the present invention to provide a method of accurately evaluating the pulse amplitudes of large and small pulses which exceed a minimum threshold level.

It is a further object of the present invention to provide a method of accurately evaluating the pulse amplitudes of pulses which may have an initial gradual slope.

It is an additional object of the present invention to provide a circuit particularly useful in carrying out the method of the present invention.

The foregoing objects are achieved, in accordance with the present invention, by a method of evaluating the amplitudes of pulses having different amplitudes which exceed a given amplitude. The method includes intermediately storing an analog signal representing the maximum amplitude of a pulse and subsequently converting the analog signal into a digital signal. The method further involves observing further pulse behavior for a given period of time upon the determination of a maximum amplitude of the pulse, and suppressing the utilization of the digital signal whenever the observation of further pulse behavior establishes that the amplitude of the pulse is increasing, which indicates that the registered maximum was merely an intermediate maximum caused by noise signals.

The foregoing objects are also achieved, in accordance with the invention, by a circuit for evaluating the amplitude of pulses from a pulse source, the pulses having different amplitudes which exceed a given amplitude. The circuit includes a pulse stretching circuit coupled to the pulse source and responsive to its output pulses for storing an analog signal representative of the maximum amplitude of the individual pulses. An analog/digital converter coupled to the pulse stretcher and responsive to the analog signal stored therein develops a digital signal representative of the maximum amplitude of an individual pulse. A controllable circuit having a control input element is coupled to the analog/digital converter and responsive to the digital signal developed therein for selectively passing the digital signals. A circuit operatively coupled to the pulse source and responsive to its individual output pulses, during a given period of time subsequent to the determination of an occurrence of a maximum pulse amplitude, produces a control signal whenever the currently present pulse is increasing in amplitude during the given period of time. The control signal input means of the controllable circuit is coupled to the circuit for producing a control signal and responsive to its control signals for suppressing the passage of the digital signal through the controllable circuit.

DESCRIPTION OF THE PREFERRED EMBODIMENTS

Figure 1:
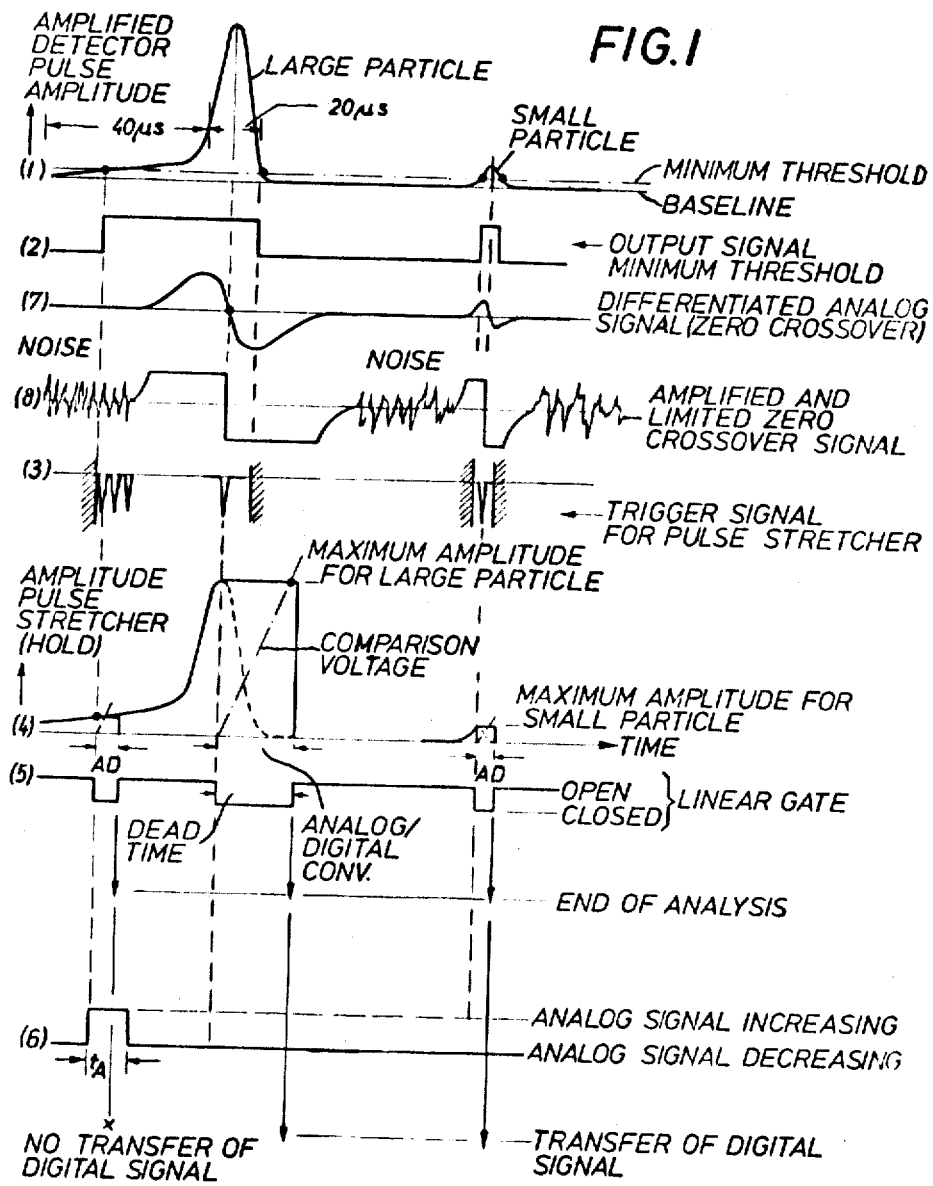
FIG. 1 is a series of graphically represented waveforms illustrating the processing of pulses to be evaluated, and the subsequent analog/digital conversion using the zero crossover technique, and incorporating the method according to the present invention.
Figure 2:
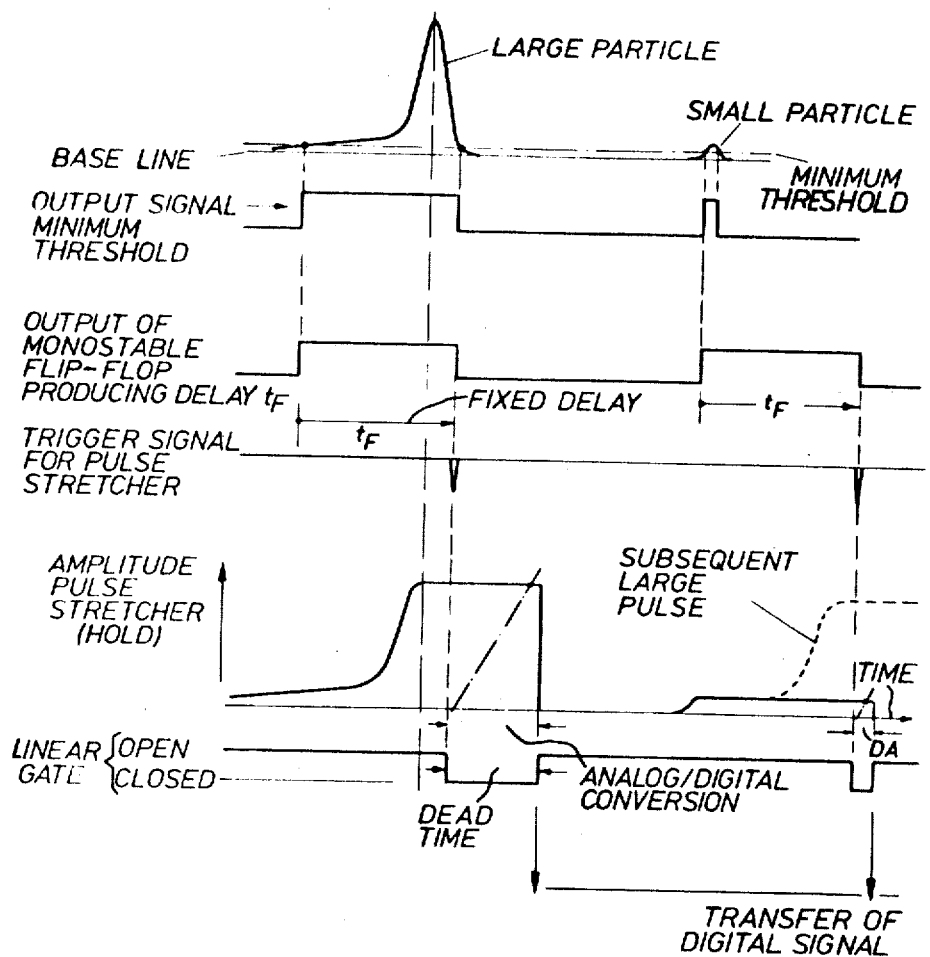
FIG. 2 is a series of graphically represented waveforms illustrating the processing of pulses to be evaluated and the subsequent analog/digital conversion using the technique of employing a fixed delay, and incorporating the method according to the present invention.

The waveforms shown in FIGS. 1 and 2 are concerned with the evaluation of pulse amplitudes which have long, initially gradual positive slopes. Such pulse shapes occur, for example, in particle volume analysis as it is effected with the aid of the so-called Coulter method. This method is described in German Published application DAS 1,806,512, corresponding to U.S. application Ser. No. 309,662 entitled "Measuring Apparatus," filed by Reinhard Thom on Nov. 27th, 1972 as a continuation of now abandoned application Ser. No. 872,893, filed on Oct. 27th, 1969. According to this method, a particle-containing electrolyte solution flows from a first vessel through a small measuring opening into a second vessel. Both vessels are provided with electrodes which are connected to an electrical measuring circuit. When a particle passes through the measuring opening, the circuit in which the two electrodes are disposed is subjected to a change in current whose magnitude is a measure of the volume of the particles passing through the measuring opening. Since the particles are already located in the electrical circuit before they pass through the measuring opening, they affect this current prior to passing through the measuring opening, particularly as they approach the opening. The field concentration is greatest in the measuring opening so that upon entrance of the individual particles into the measuring opening the current suddenly increases. Since, as already mentioned, the individual particles influence the measuring circuit before entering into the measuring opening, a gradual increase in the current occurs before the above-mentioned sudden change in the current as the individual particles approach the measuring opening.

Referring to FIG. 1, the uppermost waveform (1) shows the shape of an amplified signal in the form of a large (high amplitude) pulse and a small (low amplitude) pulse produced in a particle detecting pulse source such as the particle detector disclosed in the application of Thom, supra. The large pulse is produced by a large particle and the small pulse is produced by a subsequently arriving small particle. A minimum threshold level, indicated by the dash-dot line associated with waveform (1), is provided, this threshold effecting the suppression of all pulse noise signals having amplitudes which are less than the threshold level from zero amplitude, shown as the base line. This base line represents the zero amplitude of the amplified signal. Those portions of the signal shown as waveform (1) which exceed the threshold level are converted into a digital signal, shown as waveform (2), by conventional techniques, such as limiting.

The further waveforms shown in FIG. 1 illustrate the present invention adapted to the zero crossover technique and show the so-called "sample" and "hold" steps necessary for assuring the analog/digital conversion. The analog/digital conversion of an analog value whose amplitude changes with time, as does a pulse, is useful only if effected at a specific point in time which must be chosen in accordance with the characteristic sought to be evaluated. This point in time, in the present case, is that point in time at which the pulse has a maximum amplitude because this maximum amplitude is proportional to the volume of the particle.

Since the analog/digital converter requires a certain period for performing the conversion, during which period the analog value must be available without change, it is necessary to store this maximum value for the duration of the analog/digital conversion. The "sample" thus identifies that point in time at which a pulse amplitude is to be evaluated and the "hold" is necessary in order to store the analog value available at this point in time for the duration of the analog/digiral conversion. The circuit which, upon indication of the point in time, stores the analog value is a conventional pulse stretcher.

The point in time of the pulse maximum is determined from a first time derivative of the pulse waveform, which derivative is produced by differentiating the pulse signal. The first derivative, which is shown as waveform (7), is zero at the instant the pulse is at a maximum amplitude. The technique is called the zero crossover method because the zero passage of the differentiated pulse signal is used to determine the point in time of maximum pulse amplitude. The particular advantage of this technique is that the zero passage, and thus the time, is independent of the magnitude as well as of the rise time of the pulses which are to be evaluated. The differentiated signal, shown as waveform (7), is greatly amplified, even to the point of limiting, so that a steep negative edge is available at the points of zero crossover for large as well as small pulses, as shown in waveform (8). This negative edge is converted, using conventional techniques, into a narrow control, or trigger, pulse, shown in waveform (3), which enables the pulse stretcher. The high amplification of the differentiated pulse signal results in an increase in the noise level. In order to prevent this amplified noise from producing undesired false trigger signals, only those trigger signals which were produced during the periods when the minimum threshold level was exceeded are permitted to pass through an electronic gate circuit to control the pulse stretcher.

FIG. 1, as thus far considered, illustrates the difficulties which result in the processing of pulses having an initial gradual slope. If the minimum threshold level is set so low that low amplitude pulses produced by the passage of small particles can also be measured, the minimum threshold level is exceeded by portions of the large pulses having the gradual slope produced, for example, by the approach of large particles toward the measuring opening. The differentiated signal, waveform (7), in these circumstances, may have a relatively low amplitude and require a particularly high level of amplification to effect limiting. The output of the amplifier still includes, especially when high amplification is involved, as shown by the irregular portions of waveform (8), amplified noise pulses which appear at the input of the amplifier upon exceeding of the minimum threshold level, which pulses lead to the production of undesired trigger signals for the pulse stretcher. The analog/digital converter, in response to the undesired trigger pulses, evaluates the amplitudes of pulses at points in time during periods when the pulses have gradual slopes, that is, are not at their maximum amplitudes. The results are incorrect and lie approximately in the amplitude range of the correctively evaluated small pulses produced by the passage of small particles through the measuring opening. The volume distribution curve for small particles is distorted by these faulty analyses and is thus incorrectly displayed.

Various conventional techniques exist for effecting analog/digital conversion which will not individually discussed in detail for the details are not necessary to understanding the present invention. It is to be understood that any of these techniques can be used to accomplish this step. For the pulse amplitude evaluation the stored analog value is generally compared with a linearly increasing comparison voltage, the duration of the period from the start of this comparison voltage to its attaining the same level as the stored analog value is quantized, using a source of clock pulses having a fixed repetition rate and the number of these clock pulses is digitally counted by a conventional counter. The state of the counter is determined upon the occurrence of a match between the analog value and the comparison voltage, the counter producing, in parallel, signal bits constituting the digital signal indicating maximum pulse amplitude.

FIG. 2 shows, in a rough outline, a second method for pulse processing which is often used in nuclear spectroscopy. In this method, as in the above-discussed method, there is a minimum threshold level which must be exceeded. The trigger pulse for initiating the analog/digital conversion is derived, after a fixed delay, from the first occurrence of a signal value exceeding the minimum threshold level. The pulse stretcher stores the highest amplitude of the pulse signal until the analog/digital conversion has been completed. Thus, if the trigger pulse is produced at any time after the occurrence of the pulse maximum amplitude, the subsequent analog/digital conversion is correct. The pulse stretcher is then discharged, or reset to zero and is available for storing the next pulse maximum. In this method it is important for the fixed delay, with respect to the moment at which the threshold is exceeded, to be only long enough that the analog/digital conversion takes place as soon as possible after a pulse amplitude maximum is reached. If this delay, $t_F$, is made unnecessarily long, there exists the possibility that a second, larger pulse may arrive in the time between reaching the first maximum and the initiating of the analog/digital conversion. In this case, the correct evaluation of the second pulse is effected, but not the evaluation of the first pulse. The result is that the large pulses are treated with priority and a distortion of the actual pulse amplitude distribution is produced. Usually, the delay time $t_F$ is variable in devices employing this method so that it can be adapted to the encountered pulse shape.

The long, gradual slope of the pulses to be evaluated, such as the pulses produced in the above-mentioned particle volume analysis, present considerable difficulties. If the minimum threshold level is set so that small pulses, such as those produced by small particles, can be evaluated, the point in time of the first exceeding of the minimum threshold level is substantially advanced in the direction toward the leading edge for large pulses produced in particle detectors, and a longer delay time $t_F$ is necessary; this is not the case, however, for small pulses which may be produced in particle detectors. The analog/digital conversion of these small pulses would be effected much too late and the probability of the arrival of a large pulse in the meantime would not be insignificant. A distortion in the pulse amplitude distribution would be the result.

It is not possible to control the delay time in dependence on the pulse amplitude because, at the time of exceeding the threshold, it is not known whether the pulse has or does not have an initial gradual slope for any extended period, that is, is produced by a large particle or a small particle.

Both above-described techniques, thus exhibit substantial drawbacks in the processing of pulses having a long initial gradual slope. These drawbacks have previously not been noticed because the detector pulses in nuclear radiation spectroscopy do not have a gradual slope at their leading edges, but at most, a gradual slope at their trailing edges, which does not adversely affect evaluation.

The method of the present invention evaluates the amplitude of pulses having a pulse strecher which intermediately stores the maximum amplitude of the pulse and subsequent analog/digital conversion, the method being able to furnish an improved measuring result compared to the known methods in instances when at least some of the pulses have long initial gradual slopes. Upon the determination of a possible maximum pulse amplitude, the subsequent pulse behavior is observed over a given period of time and the evaluation or transfer of the digital value is suppressed if the observation indicates the pulse curve is increasing, proving the determined "maximum" to be only an intermediate maximum caused by noise.

The method according to the present invention is also suited for evaluating pulses which have steep initial slopes, but it is preferred for the pulse amplitude determination of pulses having widely varying amplitudes, with the high amplitude pulses having long initial gradual slopes at least in their lower partial range. The length of the observation period of the further pulse behavior after the determination of a possible maximum amplitude is advisably selected to be in the order of magnitude of the time between the maximum and a return to the base line, or level of the given minimum amplitude, for the pulses with a high amplitude. In this manner unnecessarily long observation periods, which would adversely influence the counting rate, are avoided.

In the method according to the present invention, after the minimum threshold level is first exceeded, a determination is made of whether the respective signal then produced is to be associated with a large or a small pulse. The analog/digital conversion is effected according to either the zero crossover technique or according to the trigger technique with a fixed delay shortly after the first instance of exceeding of the minimum threshold level as if a small pulse, as it occurs in the above-mentioned particle volume analysis when a small particle is being registered, were present. In a separate circuit it is additionally determined, according to the present invention, whether the amplitude of the pulse continues to increase steadily over an extended period of time upon the occurrence of a trigger signal actuated by a zero crossover or whether it reaches its maximum shortly after exceeding the threshold and then drops again. If the former is the case, i.e., if the amplitude of the pulse continues to increase steadily, the already determined result from the analog/digital conversion is discarded and the appearance of a real maximum is expected. In that case only an intermediate false maximum was present in the signal which is suppressed from the evaluation or conversion. If the amplitude of the pulse dropped shortly after exceeding the threshold, a small particle is present and the result of the analog/-digital conversion is evaluated.

Various techniques are conceivable for performing the method of the present invention. The above-mentioned zero cross-over technique will first be considered. If a faulty triggering occurs from noise pulses in the range of the initial gradual slope, a faulty analog/digital conversion is initially commenced. During the analog/digital conversion the current bahavior of the pulse is compared with the stored analog value which represents the amplitude of the received signal, which may contain pulses, at the point in time of the first incorrect trigger signal. If the currently received signal available at the time of completion of the analog/digital conversion or at a later time, but before transfer of the digital signal, is greater than the stored analog value, transfer of the digital signal is suppressed, i.e., this analysis is discarded. It is preferred to use a conventional comparator to which is fed, on the one hand, the stored analog value to be converted to a digital value, i.e., the sensed value and, on the other hand, the pulse signal. If the pulse signal exceeds the sensed value, the evaluation or transfer of the digital value is suppressed.

It may also be determined whether, at a certain point in time after the occurrence of the trigger, the detector signal has again fallen below the minimum threshold level. If the time interval for this control is selected so that, in the case of an orderly triggering, the trailing edge of the pulse definitely has fallen below the minimum threshold level, the result of this determination can be decisive for the transfer of the digital value. If, in the example of FIG. 1, the detector signal has not fallen below the minimum threshold level within 20 μs after the occurrence of a faulty trigger pulse, the digital value is not transferred. With proper triggering at the maximum amplitude of a pulse, the pulse would have fallen below the minimum threshold level during the time period, independent of the size of the pulses, so that transfer of the digital value is justified. This method has the further advantage that, if a second pulse immediately follows a preceding pulse so that the initial gradual slope of the second pulse increases the maximum amplitude of the preceding pulse by an erroneous amount, the detector signal has not fallen below the minimum threshold level at a point in time of the maximum of the first detector pulse, in the illustrated example 20 μs after the occurrence of the correct trigger signal, so that transfer of the digital value from the analog/digital conversion of the first detector pulse is prevented.

The triggering technique using a fixed delay as illustrated in FIG. 2 is less suited for evaluating the amplitude of pulses having long initial gradual slopes.

A long delay time $t_F$ results in a disadvantage for the small pulses and is not suitable for accurately determining pulse level distributions.

A short delay time $t_F$, which would be correct for small pulses, would produce incorrect evaluation of the large pulses, which would be evaluated before reaching their maximum amplitudes. It is possible, with the aid of the present invention, to suppress the transfer of such an incorrect digital signal, but the evaluation of the actual pulse maximum of the large pulse would not be possible. Possibilities are conceivable, however, for eliminating this drawback; for example, a further conversion may follow the analog/digital conversion until the conditions for the occurrence of a pulse after exceeding of the pulse maximum have been met and the digital signal is transferred.

Other triggering methods involving a plurality of threshold levels are also conceivable. The solution of the problem, however, always leads to the basis idea of effecting the once initiated analog/digital conversion, but to make its evaluation dependent on the further behavior of the pulse during or even after the analog/digital conversion. The feature of making the evaluation of the digital signal after the analog/digital conversion is a measure which might be necessary if the duration of the analog/digital conversion is too short to permit observation of the behavior of the pulse for a sufficiently long time. In this case, the transfer of the digital signal would have to be delayed, with respect to the point in time of the conclusion of the analog/digital conversion, so that the transfer can still possibly be interrupted.

Advantageous circuit embodiments for performing the method according to the present invention and modifications thereof are to be described in detail below, references being made to FIGS. 3 to 8.

Figure 3:
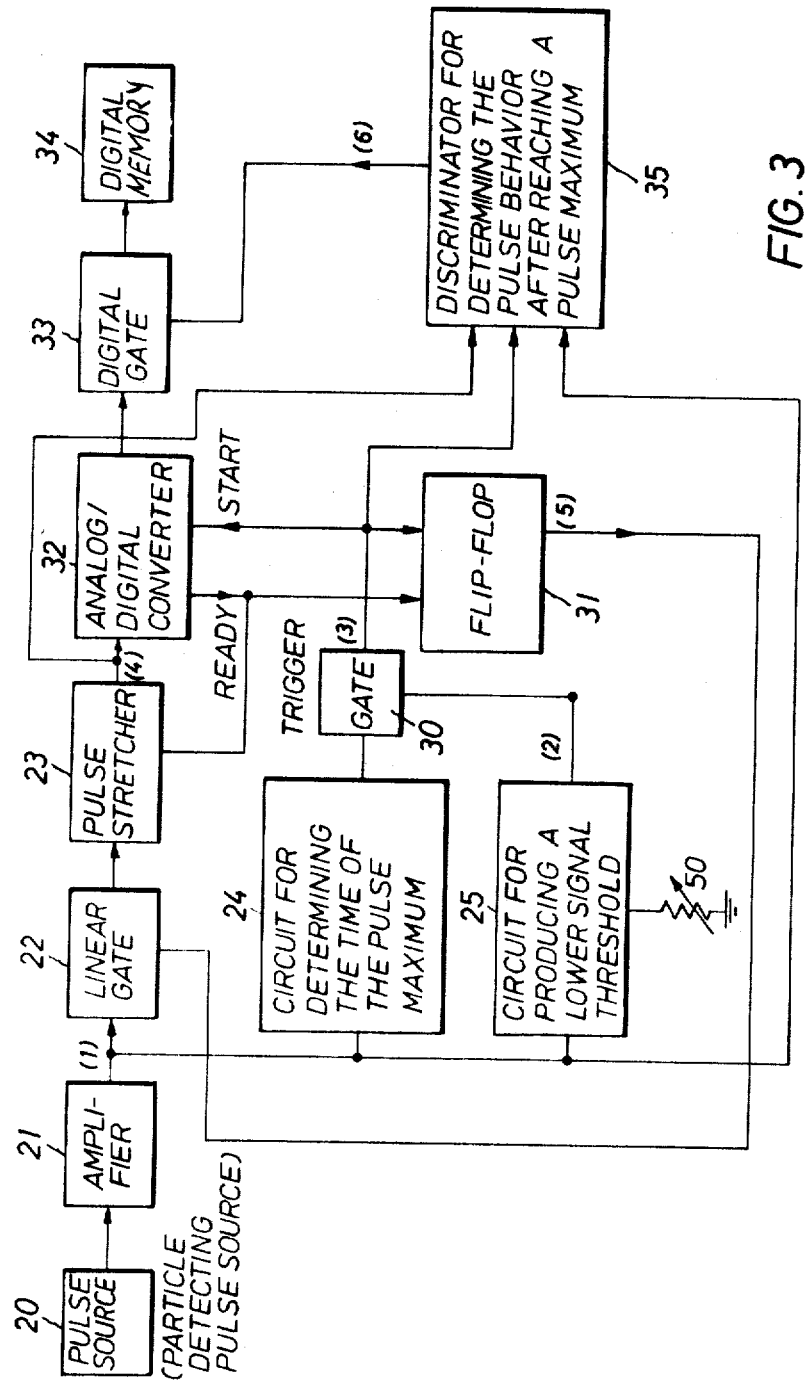
FIG. 3 is a block diagram of a circuit for evaluating pulse amplitudes according to an embodiment of the present invention.
Figure 4:
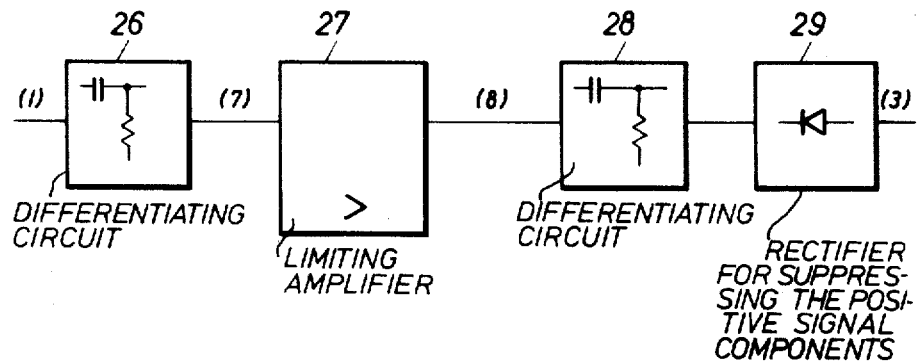
FIG. 4 is a block diagram of a circuit suitable for use as the circuit 24 of FIG. 3.

As illustrated in FIG. 3, the circuit for evaluating pulse amplitudes includes a pulse source 20, which may be a particle detector such as the detector disclosed in the application of Thom, supra. An output signal from the pulse source 20 is fed, after amplification in a linear amplifier 21, first to a linear gate 22. The linear gate 22 is assumed to be initially open so that the output pulse signal (1) from the amplifier 21 can pass through the gate 22 and reach the input of a pulse stretcher 23. The pulse stretcher 23 stores the maximum amplitude of the input pulse to form signal (4) of FIG. 1. The output pulse signal (1) from the linear amplifier 21 is also fed to a circuit 24 for determining the time of the maximum amplitude of the pulse signal (1) and to a limiter-threshold circuit 25 for producing a digital signal from those portions of the pulse signal (1) which exceed a minimum threshold level. The limiter-threshold circuit 25 is a conventional limiting amplifier which is provided with an adjustable threshold indicated diagrammatically by an adjustable impedance 50. The circuit 24 differentiates and processes the input pulse signal (1) from the amplifier 21 in such a manner that the zero passage of the differentiated signal, shown as waveform (7) in FIG. 1, occurs at the time of the maximum of the amplified output pulse signal (1) from the amplifier 21. As shown in FIG. 4, the circuit 24 includes a differentiating circuit 26 which receives the input pulse signal (1) and differentiates it, producing the differentiated analog signal shown as waveform (7) in FIG. 1. The analog signal (7) is fed to a limiting amplifier 27 which, in turn, produces a highly amplified limited signal, shown as waveform (8) in FIG. 1. This highly amplified signal is fed to a differentiating circuit 28 which produces a series of negative-going and positive-going pulses. These are fed to a rectifier circuit 29 which blocks the positive-going pulses so that at the output of the rectifier circuit 29, a signal constituted solely of negative-going pulses, as illustrated by waveform (3) shown in FIG. 1, is formed. This signal is fed to the signal input of a gate 30 (FIG. 3). The control input of the gate 30 is coupled to the limiter 25 and is responsive to its output signal, shown as waveform (2) in FIG. 1. This control input enables the gate 30 only when the signal at the input to the limiter-threshold circuit 25 has exceeded the adjustable threshold level.

The duration of the opening of the gate 30 is indicated by the vertical lines, with adjacent cross-hatching, associated with the waveform (3) shown in FIG. 1. The output signal from the gate 30 initially controls a flip-flop 31 whose output signal, shown as waveform (5) in FIG. 1, effects the closing of the linear gate 22. This prevents subsequent processing of the output pulse signal (1) from the linear amplifier 21 by the pulse stretcher 23 until the bistate flip-flop 31 is reset. Thus later signals cannot influence the evaluation. At the same time, the output signal from the gate 30 is fed to the START input of an analog/digital converter 32 which also receives the output signal (4) from the pulse stretcher 23 so that the analog/digital conversion of the output signal from pulse stretcher 23 begins. The particular analog/digital converter used is of no consequence; any number of conventional types could be selected for the converter 32. Binary evaluation procedures (successive approximation), the Wilkinson method (linear ramp procedure) as well as other known techniques can be used to effect the analog/digital conversion. Such analog/digital converters produce a READY command after completion of the analog/digital conversion which is used, as shown in FIG. 3, to reset the flip-flop 31 and to discharge the pulse stretcher 23. The above-described technique of pulse extension involves sampling and holding, steps well known in the pulse evaluation art.

The embodiment of the present invention illustrated in FIG. 3 includes additional circuit elements. While conventionally the output signal from the analog/digital converter 32 would be fed directly to a digital memory in the form of a digital word, according to FIG. 3 a digital gate 33 is disposed between the converter 32 and a digital memory 34, which digital gate 33 permits or prevents passage of this digital word to the digital memory 34 in dependence on the state of its control input. The prerequisite for the control input to the digital gate 33 is derived from a discriminator 35 for determining the pulse bahavior after a pulse amplitude maximum has been reached. This discriminator 35 produces the signal which is fed to the control input of the digital gate 33. The discriminator 35 receives three input signals, the first signal from the pulse stretcher 23, the second signal from the output of the gate 30 and the third signal from the output of the linear amplifier 21. The discriminator 35 may be designed, for example, in two ways.

Figure 5:
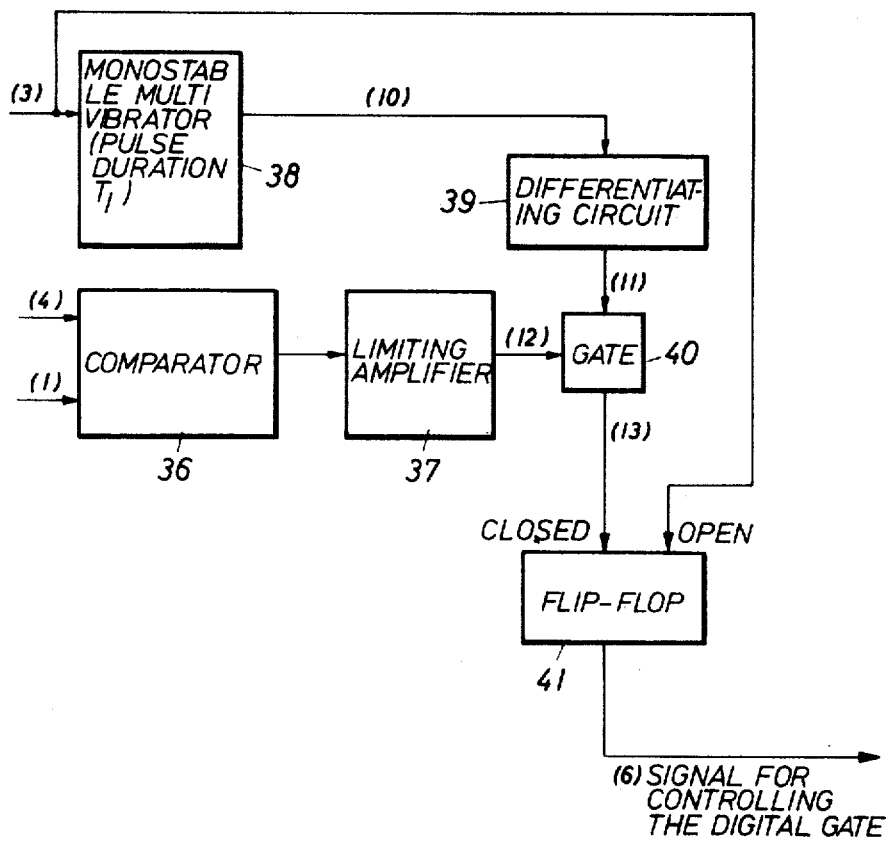
FIG. 5 is a block diagram of a circuit suitable for use as the discriminator 35 of FIG. 3.

FIG. 5 is a detailed block circuit diagram of an embodiment of a discriminator suitable for use as the discriminator of FIG. 3. As shown in FIG. 5, the discriminator 35, (FIG. 3) includes a comparator 36 which compares the signal (4) available at the output from the pulse stretcher 23 with the pulse signal (1) from the linear amplifier 21. The output from the comparator 36 is fed to a limiting amplifier 37 which produces an output signal shown as waveform (12) in FIG. 6. If an incorrect triggering was produced, as a result of the initial gradual slope of the input signal and noise (see FIG. 3 (1) and (3)), the linear gate 22 closes immediately and the signal amplitude at the time of occurrence of this incorrect trigger signal is stored in the pulse stretcher 23.

Figure 6:
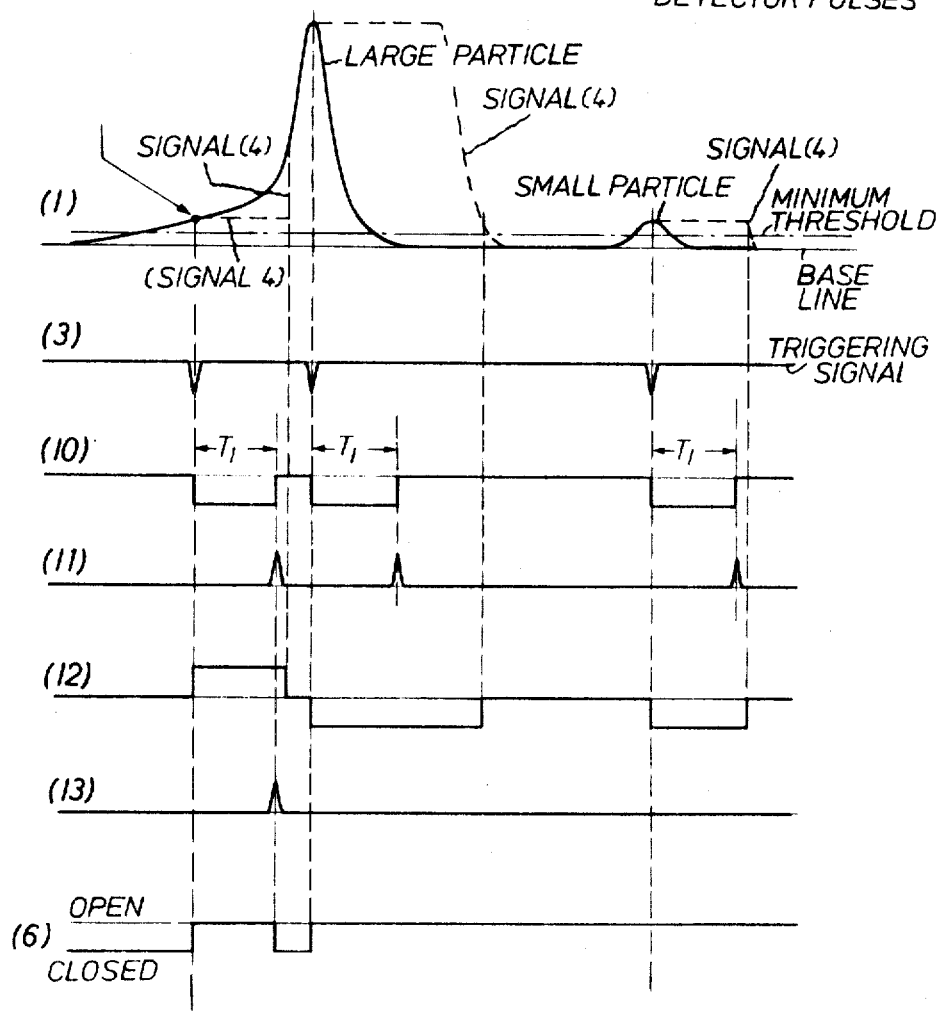
FIG. 6 is a series of graphically represented waveforms used for explaining the operation of the circuit shown in FIG. 5.

FIG. 6 shows, as a dashed curve (4), these possibly stored amplitude values. The solid line, waveform (1), indicates the output signal from the linear amplifier 21. At the time of the maximum amplitude of a pulse corresponding to a large particle, a true triggering pulse, shown in waveform (3) in FIG. 6, appears, in the same manner as the maximum amplitude of a smaller pulse, corresponding to a small particle appears. It is characteristic that the output signal from the comparator 36, which is subsequently limited and amplified by a limiting amplifier 37, is positive after an incorrect trigger pulse, and negative after a correct trigger pulse, as shown by waveform (12) in FIG. 6. This fact is utilized for preventing transfer of the digital word from the analog/digital converter 32 to the digital memory 34 through digital gate 33. For this purpose, a monostable multivibrator 38 with an adjustable pulse duration $T_1$ is controlled by the output signal from the triggering gate 30 (FIG. 3). The trailing edge of the output pulse from the monostable multivibrator 38, as illustrated by waveform (10) in FIG. 6, is processed in a differentiating circuit 39 into a control signal of short duration, shown as waveform (1) in FIG. 6. The adjustable pulse duration $T_1$ of the monostable multivibrator 38 is selected so that $T_1$ is less than the interval between the incorrect triggering time and the reaching of a true pulse amplitude maximum. The output signal from the differentiating circuit 39 is fed, via a gate 40, to a flip-flop 41. Since the gate 40 is open only when the comparator 36 provides a positive-going control signal, shown in waveform (12), the output signal from the differentiating circuit 39 can set the flip-flop 41 only when the monostable multivibrator 38 has been controlled by an incorrect triggering pulse associated with a signal at the input to the linear gate 22 which has an initially gradual slope. The output from the gate 40 is shown as waveform (13) in FIG. 6. Upon the arrival of a triggering pulse from the output of the gate 30, the flip-flop 41 is set to that state in which the transfer of the digital word from analog/digital converter 32 via the digital gate 33 to digital memory 34 is permitted. For this reason the output of the flip-flop 41 is connected to the control input of the digital gate 33. If the signal, shown as waveform (13) in FIG. 6, is able to reset the flip-flop 41, the digital gate 33 is closed after completion on the analog/digital conversion and the subsequent transfer of the digital word to the digital memory 34 is prevented, thus no evaluation of an incorrectly identified pulse maximum is produced by the gradual positive-going slope portions of the signal from the pulse source 20. With the correct triggering pulse at the time of the pulse maximum of a large pulse, produced by a large particle, and a small pulse, produced by a small particle, the flip-flop 41 is set in such a state that the digital gate 33 is open. Resetting of flip-flop 41 does not take place since the output signal from the differentiation circuit 39 cannot, because of the state of the gate 40, as predetermined by its control input signal (12), pass through the gate 40.

Figure 7:
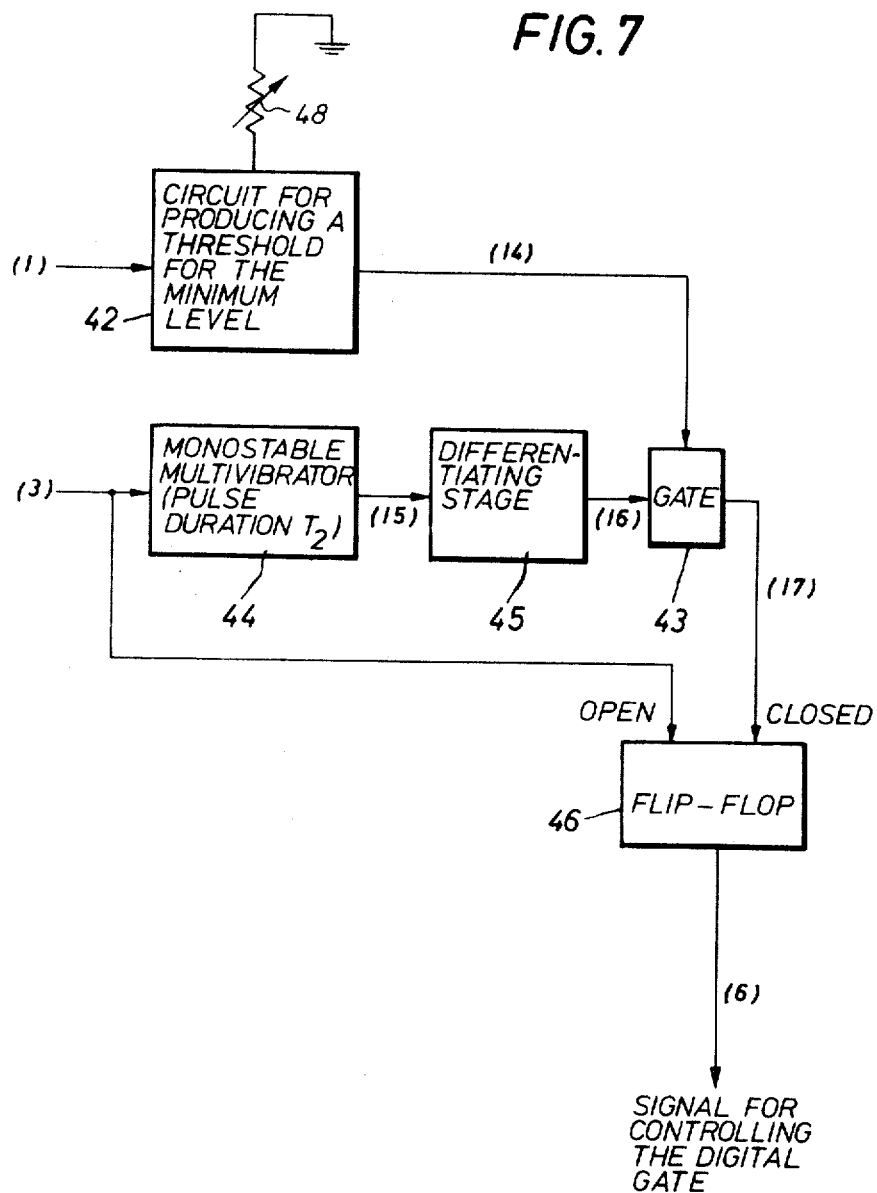
FIG. 7 is a block diagram of a second circuit suitable for use as the discriminator 35 of FIG. 3.

A second embodiment of a discriminator suitable for use as the discriminator 35, shown in FIG. 3, is illustrated in FIG. 7. The discriminator 35 (FIG. 3) as shown in detail in FIG. 7 includes a limiter-threshold circuit 42 for producing a threshold for a minimum level. The circuit 42 is constituted by conventional adjustable limiter provided with a threshold adjusting member, shown as a variable impedance 48. The input to the circuit 42 is connected to the output of the linear amplifier 21 (FIG. 3).

Figure 8:
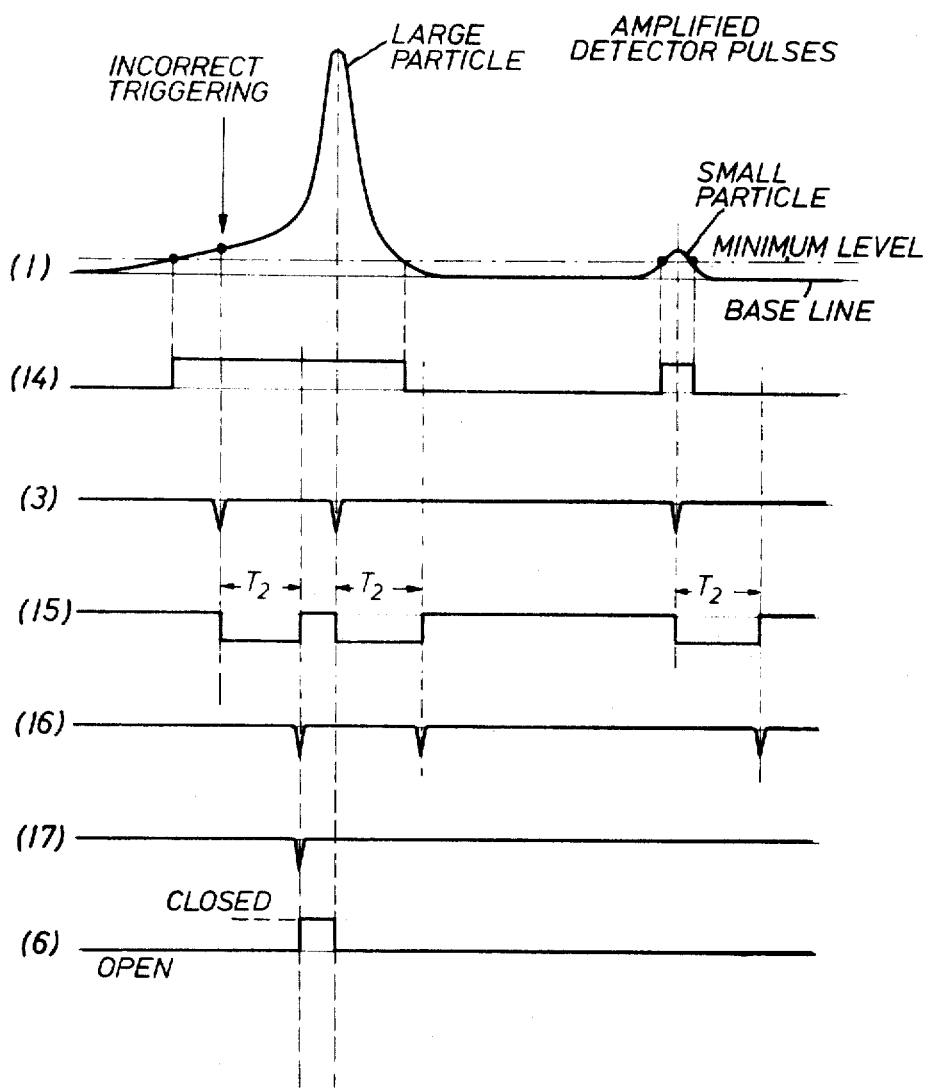
FIG. 8 is a series of graphically represented waveforms used in explaining the operation of the circuit shown in FIG. 7.

Associated with the waveform (1), shown in FIG. 8, is a dot-dash line indicating the minimum threshold level. The waveform (14) in FIG. 8 illustrates the output signal from the limiter-threshold circuit 42. This output signal is fed to the control input of a gate 43. A monostable multivibrator 44, having a pulse duration T₃, is connected from the output of the gate 30 (FIG. 3) whose output signal is shown as waveform (3) in FIG. 8. The output signal from the monostable multivibrator 44, shown as waveform (15) in FIG. 8, is fed to a differentiating circuit 45 which produces a series of short control signal pulses, as indicated by waveform (16) in FIG. 8, from the trailing edges of the output signal from the monostable multivibrator 44. The gate condition for the gate 43 is selected so that the output signal from the differentiating circuit 45 can pass the gate 43 only when the limiter-threshold circuit 42 has indicated the exceeding of the minimum threshold level by the signal from the pulse source 20 (FIG. 3) or by the amplified signal from the output of the linear amplifier 21 (FIG. 3). If the pulse duration T₃ of the monostable multivibrator 44 is selected so that it is less than the time interval between the occurrence of an incorrect trigger pulse and the maximum amplitude of a large pulse, but is greater than the time interval between the maximum of the large pulse and the time when the trailing edge of the large pulse falls below the minimum threshold level, the output pulse from differentiating circuit 45 will be able to pass the gate 43 only when an incorrect triggering had previously been present. The waveform (16) of FIG. 8 illustrates the output signal from the differentiating circuit 45 and its time relationship to output signal (14) from the limiter-threshold circuit 42 with a correctly set pulse duration T₃. FIG. 8 shows an output signal (17) from the gate 43 which sets a flip-flop 46. The output signal from the flip-flop 46 closes the digital gate 33 (FIG. 3) and thus prevents the transfer of the digital word from the analog/digital converter 32 (FIG. 3) to the digital memory 34 (FIG. 3). During the transfer of a newer triggering pulse from the triggering gate 30 (FIG. 3) the flip-flop 46 is reset again and thus the digital gate 33 is again opened.

The present invention can be used with particular advantage in the particle volume analysis, preferably in the analysis of such volume distributions in which large particles and small particles are to be examined simultaneously. This problem is present in particular in the analysis of the size distribution of erythrozytes (red cells) and thrombozytes (platelets) in whole blood.

In the arrangement according to FIG. 3 the pulse source 20 is preferably a device for classifying particles suspended in a test fluid as disclosed in the application of Thom, and the German published application cited earlier.

Figure 9:
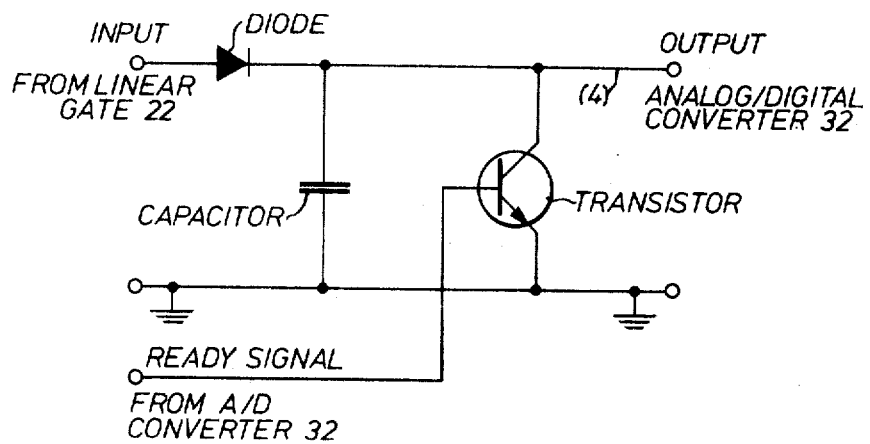
FIG. 9 is a circuit diagram of the pulse stretcher for use as the corresponding circuit 23 in FIG. 3.
Figure 10:
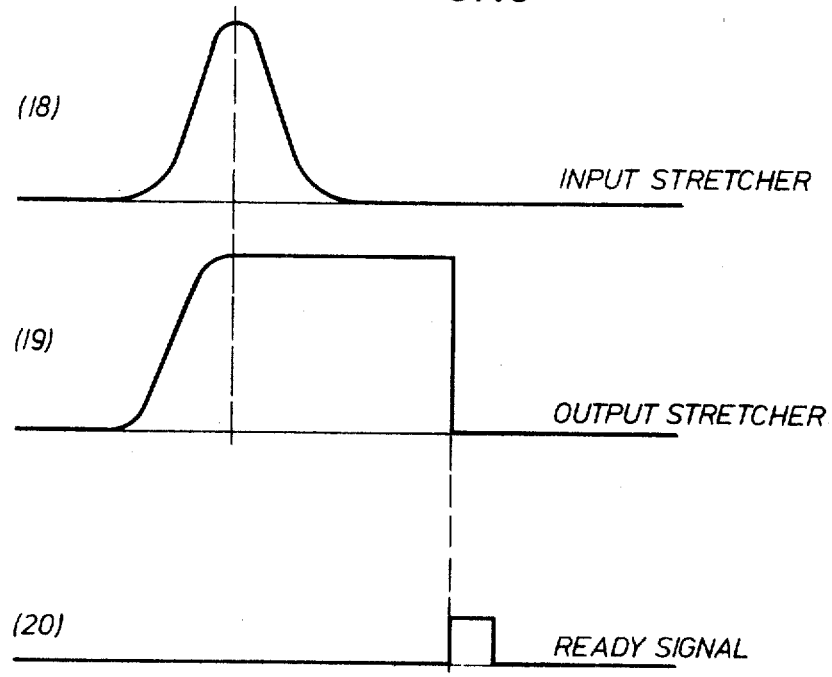
FIG. 10 is a series of graphically represented waveforms used in explaining the operation of the circuits shown in FIG. 9.

In the arrangement according to FIG. 3 the pulse stretcher 23 is preferably a circuit according to FIG. 9. This circuit includes a diode, a capacitor and a transistor connected as shown in FIG. 9. The stretching procedure is performed as follows:

The input signal delivered from the linear gate 22 of FIG. 3 which is shown in FIG. 10 signal number (18) charges the capacitor via the diode which is conducting until the maximum pulse amplitude is reached. Therefore the output signal (19) shown in FIG. 10 is identical up to the point in time of maximum pulse amplitude. When the input signal (18) of FIG. 10 starts to decrease the diode changes into nonconductive state leaving the charge of the capacitor unaffected. Therefore the output signal (19) of FIG. 10 remains constant at the value of maximum pulse amplitude. During this period the transistor is nonconductive. When the analog/digital converter number 32 of FIG. 3 has finished conversion of the stretched pulse maximum amplitude the ready signal (20) of FIG. 10 is delivered from the analog/digital converter to the base of the transistor of FIG. 9. When this ready signal occurs the transistor of FIG. 9 starts to draw current from the capacitor of FIG. 9 to ground discharging the capacitor in a rather short time interval. The stretching procedure is finished and the pulse stretching circuit of FIG. 9 is again ready to accept a new signal when the ready signal has returned to zero and therefore the transistor of FIG. 9 is again nonconductive.

In the arrangement according to FIG. 3 the circuit for producing a lower signal threshold 25 is preferably a device of a high speed differential comparator manufactured and sold by Fairchild Semiconductor, a division of Fairchild Camera and Instruments Corp., Type μ A 710. The input signal is applied to the inverting or the non-inverting input of the comparator depending on the polarity of the output signal necessary to drive the gate 30 of FIG. 3 properly. The adjustable threshold level is derived from a voltage source the constant voltage of which is divided by the adjustable impedance 50 and supplied to the other input of the comparator μ A 710 which is not connected to the output of the amplifier 21 of FIG. 3. The comparator Type μ A 710 has been offered and described in details including a circuit diagram in the 1970 catalog, Library of Congress Catalog Card 75 - 87,311, 1970 © 1969 Fairchild Semiconductors BR - BR - 0015 - 29 100 M.

In the arrangement according to FIG. 7 the circuit for producing the threshold for the minimum level 42 is preferably a device of the same Type μ A 710 of said manufacturer. Application of the signals and the adjustable impedance 48 of FIG. 7 is identical with the above mentioned application according to the circuit for producing a lower signal threshold 25 of FIG. 3.

It will be understood that the above description of the present invention is susceptible to various modifications, changes and adaptations, and the same are intended to be comprehended within the meaning and range of equivalents of the appended claims.

I claim:

1. In a method for evaluating the amplitudes of pulses having a range of peak amplitudes, which exceed a given amplitude, the method including detecting each apparent pulse amplitude maximum, storing intermediately in a pulse stretcher an analog signal representing the maximum amplitude of a pulse, and subsequently converting the stored signal into a digital signal, the improvement comprising: electronically monitoring the pulse waveform for a given period of time after detection of an apparent pulse maximum amplitude; and electronically suppressing the utilization of the associated digital signal whenever said step of monitoring reveals that during the given period of time the amplitude of the pulse is increasing, which indicates that the registered maximum was an intermediate maximum caused by noise signals.

2. A method as defined in claim 1, wherein said step of suppressing is carried out by blocking transfer of the digital signal.

3. A method as defined in claim 1, wherein said step of suppressing is carried out by blocking evaluation of the digital signal.

4. A method as defined in claim 1 further comprising supplying pulses to be evaluated having widely varying amplitudes, at least some of the pulses having high amplitudes and initial gradual slopes at least in their lower partial range.

5. A method as defined in claim 1, wherein said monitoring step takes place for a period of time substantially equal to the period of time required for a pulse of high amplitude to reach its lowest possible level after that point in time at which its maximum occurs.

6. A method as defined in claim 1, wherein said monitoring step includes comparing the amplitude of said analog signal with the current amplitude of said pulse signal, and said suppressing step is effected whenever said pulse signal exceeds said analog signal.

7. A method as defined in claim 1, wherein said monitoring step comprises determining whether said pulse is below said given amplitude, after a maximum has been registered at the end of a given time period.

8. A method as defined in claim 1, comprising the further step of supplying pulses from a pulse source constituted by a particle detector.

9. A method as defined in claim 1 further comprising the step of temporarily storing each digital signal until the end of the monitoring of its associated pulse.

10. A method as defined in claim 1 wherein said step of monitoring is carried out for a period of time independent of the time during which the pulse exceeds the given amplitude.

11. A circuit for evaluating the amplitude of pulses from a pulse source, the pulses having a range of peak amplitudes, which exceed a given amplitude, the circuit comprising, in combination:
   a. pulse stretching means coupled to the pulse source and responsive to its individual output pulses for intermediately storing an analog signal representative of the maximum amplitude of the individual pulses;
   b. analog/digital converter means coupled to said pulse stretching means and responsive to the analog signal stored therein for developing a digital signal representative of the maximum amplitude of each individual pulse;
   c. controllable means coupled to said analog/digital converter means and responsive to the digital signal developed therein for selectively passing the digital signal, said controllable means having a control signal input means; and
   d. means operatively coupled to said pulse source and responsive to the behavior of its individual output pulses during a given period of time subsequent to the determination of an occurrence of a maximum pulse amplitude for producing a control signal whenever the currently present pulse is increasing in amplitude during the given period of time,
   e. said control signal input means of said controllable means being coupled to said means for producing a control signal and responsive to the control signals produced therein for suppressing the passage of the digital signal through said controllable means whenever such control signal appears.

12. A circuit for evaluating the amplitude of pulses from a pulse source, the pulses having a range of peak amplitudes which exceed a given amplitude, the circuit comprising, in combination;
   a. linear gate means having signal input means for receiving pulses from the pulse source, control signal input means and output means;
   b. pulse stretching means coupled to said output means of said linear gate means and responsive to its output signals for intermediately storing the maximum amplitude of individual pulses passed by said linear gate means, said pulse stretching means having control input means;
   c. analog/digital converter means having its signal input means coupled to said pulse stretcher means for converting the stored signals representing maximum pulse amplitudes into digitial signals, said analog/digital converter means having a START input means and a READY output means;
   d. digital gate means coupled to said analog/digital converter means for selectively passing digitial signals received therefrom, said digitial gate means having a control input means;
   e. digital memory means coupled to said digital gate means for storing digital signals received therefrom;
   f. means operatively couplable to the pulse source and responsive to its pulse signals for producing an output signal indicative of the time of occurrence of each pulse maximum;
   g. added gate means coupled to said means for producing an output signal for selectively passing signals received therefrom indicative of the times of occurrence of pulse maximums, said gate means having a control input means;
   h. means operatively couplable to the pulse source and responsive to its pulse signals for producing a threshold signal indicative of receipt of any signal in excess of a given minimum threshold level;
   i. means for coupling said control input means of said added gate means to said means for producing a threshold signal for controlling passage of the signals indicative of the times of occurrence of pulse maximums;
   j. means for coupling said START input means of said analog/digital converter means to said added gate means for receiving signals passed therefrom to initiate conversion;
   k. bistable flip-flop means having a first input means coupled to said added gate means and responsive to signals there-from, and a second input means coupled to said READY output means of said analog/digital converter means and responsive to signals therefrom for producing a control signal upon receipt of a READY signal from said READY output means;
   l. means for coupling said control input means of said linear gate means to said bistable flip-flop means for selectively enabling said linear gate means by the control signal from said bistable flip-flop means;
   m. means for coupling said control input means of said pulse stretching means to said READY output means of said analog/digital converter means for resetting said pulse stretching means upon receipt of a READY signal from said converter means;
   n. discriminator circuit means for determining the behavior of individual output pulses from the pulse source during a given period of time subsequent to the determination of the occurrence of a pulse maximum and for developing a control signal, said discriminator means having a first input means for receiving signals from the pulse source and a second input means coupled to said added gate means for receiving signals passed therethrough; and o. means coupling said control input means of said digital gate means to said discriminator circuit means for controlling passage of signals through said digital gate means in response to control signals from said discriminator circuit means.

13. A circuit as defined in claim 12, wherein said discriminator circuit means further has third input means coupled to said pulse stretcher for receiving signals there-from and comprises:

comparator means having two input means constituted respectively by said first and third input means of said discriminator circuit means for producing an output signal representing the difference between the signals received in its two input means;

limiting amplifier means coupled to said comparator means and responsive to its output signal for producing a limited output signal;

monostable multivibrator means having an input constituted by said second input means of said discriminator circuit means for producing an output pulse signal having a given duration ($T_1$) in response to each signal received at its input;

differentiating circuit means coupled to said monostable multivibrator means for differentiating the trailing edges of the pulse signal therefrom;

further gate means having a signal input means coupled to said differentiating circuit means and a control input means coupled to said limiting amplifier means for selectively passing differentiated signals received from said differentiating circuit means under the control of the limited output signal received from said limiting amplifier means; and bistable multivibrator means having a first input means coupled to said further gate means and a second input means coupled to said added gate means for producing the control signals of said discriminator circuit means which control said digital gate means.

14. A circuit as defined in claim 12, wherein said discriminator circuit means comprises:

circuit means responsive to signals from the pulse source for producing a threshold output signal in response to receipt of signals exceeding a given minimum level;

monostable multivibrator means coupled to said added gate means and responsive to signals passed thereby for producing a pulse signal of given duration ($T_2$) in response to each received signal;

differentiating circuit means coupled to said monostable multivibrator means for differentiating the trailing edge of the pulses received therefrom;

further gate means having its signal input means coupled to said differentiating circuit means and its control input means coupled to said circuit means for producing threshold output signals for selectively passing signals from said differentiating circuit means; and bistable multivibrator means having a first input means coupled to said further gate means and a second input means coupled to said added gate means for producing the control signals of said discriminator circuit means which control said digital gate means.

* * * * *